US012139660B2

(12) United States Patent
Kalgaonkar et al.

(10) Patent No.: US 12,139,660 B2
(45) Date of Patent: *Nov. 12, 2024

(54) TREATMENT OF SUBTERRANEAN FORMATIONS

(71) Applicants: Saudi Arabian Oil Company, Dhahran (SA); KING FAHD UNIVERSITY OF PETROLEUM & MINERALS, Dhahran (SA)

(72) Inventors: Rajendra Arunkumar Kalgaonkar, Dhahran (SA); Eyad Alali, Dammam (SA); Mohammed A. Bataweel, Dhahran (SA); Nisar Ullah, Dhahran (SA); Muhammad Mansha, Dhahran (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,256

(22) Filed: May 1, 2023

(65) Prior Publication Data

US 2023/0265334 A1    Aug. 24, 2023

Related U.S. Application Data

(62) Division of application No. 17/509,857, filed on Oct. 25, 2021, now Pat. No. 11,685,855.

(51) Int. Cl.
*C09K 8/508* (2006.01)
*E21B 33/138* (2006.01)

(52) U.S. Cl.
CPC .......... *C09K 8/5086* (2013.01); *E21B 33/138* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 5,979,557 A | 11/1999 | Card et al. |
| 6,306,800 B1 | 10/2001 | Samuel et al. |
| 6,637,517 B2 | 10/2003 | Samuel et al. |
| 7,008,908 B2 | 3/2006 | Chan et al. |
| 7,237,608 B2 | 7/2007 | Fu et al. |
| 7,458,424 B2 | 12/2008 | Odeh et al. |
| 7,533,723 B2 | 5/2009 | Hughes et al. |

(Continued)

OTHER PUBLICATIONS

Chu et al., "A facile route towards the preparation of ultra-long-chain amidosulfobetaine surfactants," Synlett, 2009, 16:2655-2658, 4 pages.

*Primary Examiner* — Andrew Sue-Ako
(74) *Attorney, Agent, or Firm* — Fish & Richardson P.C.

(57) ABSTRACT

A method, wellbore, and pill for treating a region of a subterranean formation adjacent a wellbore zone of the wellbore, including injecting a gellable treatment composition (e.g., as the pill) through the wellbore zone into the region of the subterranean formation adjacent the wellbore zone, allowing the gellable treatment composition to form nanoparticles in-situ in the region and gel in the region via heat provided by the region to prevent or reduce flow of an unwanted fluid from the region into the wellbore zone. The gellable treatment composition may include a zwitterionic gemini surfactant (ZGS).

4 Claims, 7 Drawing Sheets

(56) References Cited

U.S. PATENT DOCUMENTS

| | | | |
|---|---|---|---|
| 7,621,334 | B2 | 11/2009 | Welton et al. |
| 7,858,563 | B2 | 12/2010 | Hughes et al. |
| 7,875,575 | B2 | 1/2011 | Huang et al. |
| 8,053,397 | B2 | 11/2011 | Huang et al. |
| 9,670,397 | B2 | 6/2017 | Ghumare et al. |
| 10,266,748 | B2 | 4/2019 | Kalgaonkar et al. |
| 10,351,755 | B2 | 7/2019 | Wagle et al. |
| 10,407,609 | B2 | 9/2019 | Kalgaonkar et al. |
| 11,203,712 | B1 | 12/2021 | Kalgaonkar et al. |
| 11,685,855 | B2 * | 6/2023 | Kalgaonkar .......... E21B 33/138 166/292 |
| 2011/0071056 | A1 | 3/2011 | Saini et al. |
| 2012/0085534 | A1 | 4/2012 | Morvan |
| 2016/0024370 | A1 | 1/2016 | Ba geri |
| 2021/0380867 | A1 | 12/2021 | Kalgaonkar et al. |
| 2021/0380871 | A1 | 12/2021 | Kalgaonkar et al. |

\* cited by examiner

TREATMENT OF SUBTERRANEAN FORMATIONS

CROSS-REFERENCE TO RELATED PATENT APPLICATIONS

This application is a divisional of U.S. patent application Ser. No. 17/509,857, filed Oct. 25, 2021, the contents of which are incorporated by reference herein.

TECHNICAL FIELD

This disclosure relates to shutoff of unwanted fluids produced from a subterranean formation into a wellbore.

BACKGROUND

A wellbore in a subterranean formation in the Earth crust may be treated. The treatments of the wellbore may treat the subterranean formation. The wellbore treatments may facilitate production of hydrocarbon, such as crude oil, from the subterranean formation. A problematic section of a wellbore to be treated may be a water zone in which water enters the wellbore from the hydrocarbon formation or underlying water aquifer. The influx of water into the wellbore during production of crude oil can add cost. The production of water along with the crude oil from the hydrocarbon formation can lead to surface processing of the water and injection of the water back into the hydrocarbon formation for disposal or pressure maintenance. Such processing and injection of water produced from the wellbore water zone causes increased costs of the oil production.

In certain instances, natural gas may also be an unwanted produced fluid. Thus, a gas zone in the wellbore may be a problematic section of the wellbore (and associated region of the subterranean formation) to be treated. Natural gas as a produced unwanted gas is generally separated and flared before the crude oil is distributed. In some operations, gas-handling capabilities are not readily available at the well site.

SUMMARY

An aspect relates to a method of treating a region of a subterranean formation adjacent a wellbore zone of a wellbore, the method including injecting a gellable treatment composition through the wellbore zone into the region of the subterranean formation adjacent the wellbore zone, allowing the gellable treatment composition to gel in the region via heat provided by the region to prevent or reduce flow of an unwanted fluid from the region into the wellbore zone, wherein allowing the gellable treatment composition to gel includes forming nanoparticles in-situ in the region via the gellable treatment composition. The gellable treatment composition may include a zwitterionic gemini surfactant. The method includes producing desired hydrocarbon from the subterranean formation through the wellbore to Earth surface, wherein a gel formed from the gellable treatment composition in the region prevents or reduces production of the unwanted fluid from the region into the wellbore, and wherein the gel includes the nanoparticles.

Another aspect is a wellbore in a subterranean formation, the wellbore including a wellbore zone having a gel that restricts flow of fluid from the subterranean formation into the wellbore at the wellbore zone, wherein the gel includes zwitterionic gemini surfactant and silica nanoparticles.

Yet another aspect is a pill that is a pill as applied to a wellbore formed through Earth surface in a subterranean formation, the pill including a zwitterionic gemini surfactant (ZGS), a salt, an orthosilicate, an acid, and water.

The details of one or more implementations are set forth in the accompanying drawings and the description below. Other features and advantages will be apparent from the description and drawings, and from the claims.

DETAILED DESCRIPTION

Figure 1:
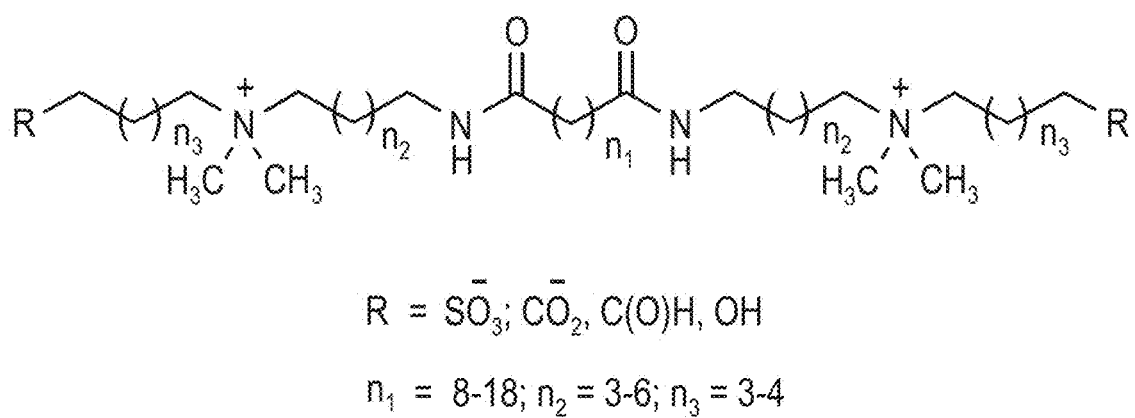
FIG. 1 is a diagram of example structures of zwitterionic gemini surfactants.

Some aspects of the present disclosure are directed to applying a shutoff material into a wellbore for water shutoff or gas shutoff, or both. The shutoff material may have the following components: (1) a viscoelastic surfactant (VES) that is a zwitterionic gemini surfactant, such as the structures depicted in FIG. 1; (2) an activator (e.g., salt, such as calcium chloride or other salts) to gel the VES; (3) an orthosilicate; and (4) a catalytic amount of acid (e.g., hydrochloric acid) to convert the orthosilicate in-situ (downhole) to silica nanoparticles. The orthosilicate may be, for example, tetraethyl orthosilicate (TEOS) $[Si(OC_2H_5)_4]$ or tetramethyl orthosilicate (TMOS) $[Si(OCH_3)_4]$, or a combination thereof. Alternatives to orthosilicate as sources of silica (silicon dioxide) for forming silica nanoparticles in-situ may include, for example, silicic acid and sodium silicate.

The composition (shutoff material) exhibits gelation as the temperature increases. In application, the shutoff material may be pumped (e.g., as a pill) from the surface into the wellbore to the water zone or gas zone. While the shutoff material may have a modest viscosity at the Earth surface, the material advantageously exhibits shear thinning behavior in the pumping of the material downhole—thus, the viscosity is lowered benefitting the pumping. At the water zone or gas zone, the VES, activator, and in-situ formed nanoparticles give a viscous gel at formation temperature. The orthosilicate (along with the acid) gives the silica $(SiO_2)$ nanoparticles generated in-situ in the wellbore at formation temperature. The viscous gel having or formed from the silica nanoparticles plugs permeability at the zone for shutoff. The zone may be a water zone and the shutoff may be water shutoff. The zone may be a gas zone and the shutoff may be gas shutoff. The shut off material may plug formation permeability. The shut off material may gel in the formation, forming a solid barrier to flow.

Some aspects of the present disclosure are directed to utilizing a zwitterionic gemini surfactant in the treatment of a zone of a wellbore including the near wellbore region. Beneficial aspects of the zwitterionic gemini surfactant compared to other viscoelastic surfactants may be that structural characteristics of zwitterionic gemini surfactants include a relatively large number of hydrophilic groups, which enable zwitterionic gemini surfactants to self-assemble for their enhanced viscosification. Moreover, the zwitterionic gemini surfactants may also enjoy advantages of decreasing absorption loss, less damage of the reservoir, and improved adaptability of active agents to high salinity. See Kamal, M. S. (2016) A review of Gemini surfactants: Potential application in enhanced oil recovery, Journal of Surfactants and Detergents, 19:223-236, https://doi.org/10.1007/s11743-015-1776-5.

A surfactant may be a substance that reduces surface tension of a liquid in which the surfactant is dissolved. Surfactants may be compounds that lower the surface tension (or interfacial tension) between two liquids, between a gas and a liquid, or between a liquid and a solid. Surfactants can be generally amphiphilic compounds, meaning they contain two or more groups that in pure form are insoluble in each other. A gemini surfactant may include two surfactant molecules chemically bonded together by a spacer. Gemini surfactants, sometimes called dimeric surfactants, may have two hydrophilic head groups and two hydrophobic groups in the molecule. Gemini surfactants may be composed of two hydrophilic head groups and two hydrophobic tails linked by a spacer. A zwitterion may be a molecule that has at least two functional groups: one having a positive charge and the other having a negative charge, with an overall charge of zero. A zwitterion may be a molecule that contains an equal number of positively- and negatively-charged functional groups. Zwitterionic surfactants may be amphiphilic organic compounds that hold hydrophobic groups in their molecular tail and hydrophilic groups in their molecular head. The zwitterionic gemini surfactant may be viscoelastic surfactant (VES). VES fluids are commonly utilized in hydraulic fracturing. Under certain conditions, VES molecules arrange into colloidal structures called micelles. With these structures in some instances, the hydrocarbon tails of the surfactants orient toward each other while the polar head groups form an interface with the surrounding aqueous media. As appreciated by one of ordinary skill in the art, the surfactant as a VES may be capable of forming a wormlike micelle that can entangle and thus impart viscosity to the fluid. The fluid system may include salt to drive formation of the micelles, such as worm-like micelles that entangle.

Embodiments include a method of sealing a subterranean formation utilizing a zwitterionic gemini surfactant and an activator for applications such as water shutoff or gas shutoff. This surfactant (solution) in presence of the activator can viscosify to form a solid gel as temperature increases. In implementations, the gellable system (including the surfactant and activator) as a shutoff material can be placed downhole as a single pill because the gelation process is generally temperature activated. Gelling will generally not occur until the pill is heated (increased in temperature) by the subterranean formation. The shutoff material may be a pre-gel shutoff material (a pre-gel, gellable system, gellable treatment composition) at the Earth surface before being pumped into the wellbore. The shutoff material may be a gel shutoff material (a gel) in the region of the subterranean formation that is treated with the shutoff material.

The aforementioned in-situ generation of the $SiO_2$ nanoparticles via the gellable system contributes to the formation of the gel shutoff material. The generating (and thus presence) of the silica nanoparticles aids with water shutoff (or gas shutoff). The silica nanoparticles are formed in situ during the dissolution of surfactant in a salt solution, such as in a calcium chloride ($CaCl_2$)) solution. The produced silica nanoparticles are transformed as the fluid heats up into polymeric gel that blocks the water channels by reducing the permeability of the water-producing zone. Such generally aides in blocking unwanted water production into the wellbore. The diameter of the $SiO_2$ nanoparticles may be, for example, less than 150 nanometers (nm). In the subterranean formation at the wellbore zone of interest, the acid, e.g., hydrochloric acid (HCl), catalyzes the reaction of the orthosilicate (e.g., TEOS, TMOS, etc.) into the $SiO_2$ nanoparticles. The reaction may involve the hydrolysis of monomeric orthosilicate and subsequent formation of the $SiO_2$ nanoparticles. In particular, the acid catalyzes the hydrolysis of orthosilicate (e.g., TEOS) to produce hydrolyzed precursors of orthosilicate (e.g., TEOS). The hydrolyzed precursors are transformed to oligomeric precursors, which leads to the formation of $SiO_2$ nanoparticles. Again, the acid catalyzes the reaction in the gel. The acid-catalyzed reaction may form or facilitate formation of the gel. The acid (e.g., HCl) is a catalyst to transform orthosilicate (e.g., TEOS) into silica nanoparticles, which allows for production of polymeric gel. The reaction of orthosilicate (via the acid catalyst) into $SiO_2$ nanoparticles can occur at room temperature. However, the reaction is delayed at such a low temperature. In contrast, at typical subterranean-formation temperature (e.g., at least 50° C., or in the range of 50° C. to 175° C.), the rate of this reaction is increased due to the higher temperature.

Excessive water production can reduce the economic life of producing wells. High water cut in produced hydrocarbon can affect the economic life of producing wells and may contribute to equipment damage, such as by scale deposition, fines migration, asphaltene precipitation, corrosion, etc. Moreover, the processing to separate, treat, and dispose of the produced water leads to increased operating costs. Embodiments of the present techniques provide for shutoff of water in water-producing zones. Embodiments may also provide for shutoff of natural gas in natural-gas producing zones, such as when natural gas is an unwanted (undesired) produced fluid. The shutoff material as a conformance material is generally based on an activation chemistry to gel the zwitterionic viscoelastic surfactant. The in-situ formation of the silica nanoparticles contributes to the shutoff.

Implementations include employing a shutoff material composition in downhole conditions for water shutoff (or gas shutoff). The shutoff material as formulated prior to application may be labeled as a gellable treatment composition. As indicated, the shutoff material composition as formulated at the Earth surface (e.g., adjacent the wellbore) may include: zwitterionic gemini surfactant (a viscoelastic surfactant), activator (e.g., salt), orthosilicate (e.g., TEOS), and acid as catalyst for the orthosilicate. The combination of zwitterionic dispersion with activator may result in a gelled solid-based shutoff material for water shutoff (or gas shutoff). Salt (e.g., calcium chloride) may act as an activator that gels the zwitterionic gemini surfactant. As indicated, in embodiments of methods to prevent unwanted water (or gas) production, the zwitterionic gemini surfactant and the activator (along with the orthosilicate and the acid) may be pumped (or otherwise applied) downhole as a single pill. The shutoff composition may generally gel as the temperature increases under downhole conditions.

FIG. 1 is an example of structures of zwitterionic gemini surfactants that may be employed in the shutoff material of the present techniques. The zwitterionic gemini surfactants may be labeled as short-chain zwitterionic gemini surfactant in that the number of carbons in the molecule is generally less than 30. The value of n can be, for example, $n_1$=8-18, $n_2$=3-6, and $n_3$=3-4. The R functional group (at each end) can be, for example, sulfonates, carboxylates, aldehydes, alcohols, etc. Thus, R can be, for example, a sulfonate, a carboxylate, an aldehyde, or an alcohol. The zwitterionic gemini surfactant employed can be a specific structure of the structures represented by FIG. 1, or a mixture of the depicted structures having differing values for n and/or different end functional groups, and the like.

The shutoff material initially as a gellable treatment composition as formulated at the Earth surface may have the following components: (1) a zwitterionic gemini surfactant (a VES); (2) an activator (e.g., salt) to gel the VES; (3) orthosilicate (e.g., TEOS); and (4) a catalytic amount of acid (e.g., HCl) to convert the orthosilicate in-situ (downhole) to silica nanoparticles. The gellable composition as prepared at surface is an aqueous composition. Examples of the zwitterionic gemini surfactant (ZGS) include the structures depicted in FIG. 1. Other zwitterionic gemini surfactants are applicable. The activator as an inorganic salt or an organic salt, or a combination thereof. The inorganic salt may be, for example, calcium chloride, sodium chloride, potassium chloride, or sodium bromide, or any combinations thereof. The organic salt may be, for example, sodium citrate or sodium salicylate, or a combination thereof. Other salts for viscosity buildup are applicable. Example numerical ranges in weight percent (wt %) for the gellable composition (e.g., as a pill) are ZGS (2.5 wt % to 10 wt %), salt (5 wt % to 30 wt %), orthosilicate (1 wt % to 10 wt %), acid (at least one molar equivalent to the orthosilicate) and the balance is water for the formulation at 100 wt %. The amount of water may be, for instance, in the range of 60 wt % to 85 wt %. These numerical ranges are given as examples. Moreover, additional compounds or components may be included in the gellable treatment composition (shutoff material as formulated at surface). In some implementations of these given examples of numerical ranges of component concentrations, the acid is HCl, the salt is calcium chloride, and the orthosilicate is TEOS.

Lastly, as discussed, the R functional group (at each end) in FIG. 1 can be, for example, a sulfonate group ($SO_3^-$), a carboxylate group ($CO_2^-$), an aldehyde functional group (—CHO), or a hydroxyl functional group (—OH). A carboxyl group (COOH) is a functional group consisting of a carbonyl group (C=O) with a hydroxyl group (OH) attached to the same carbon atom.

An aldehyde group is a functional group with the structure —CHO, consisting of a carbonyl center (a carbon double-bonded to oxygen) with the carbon atom also bonded to hydrogen. This functional group itself is known as an aldehyde or formyl group.

Figure 2:
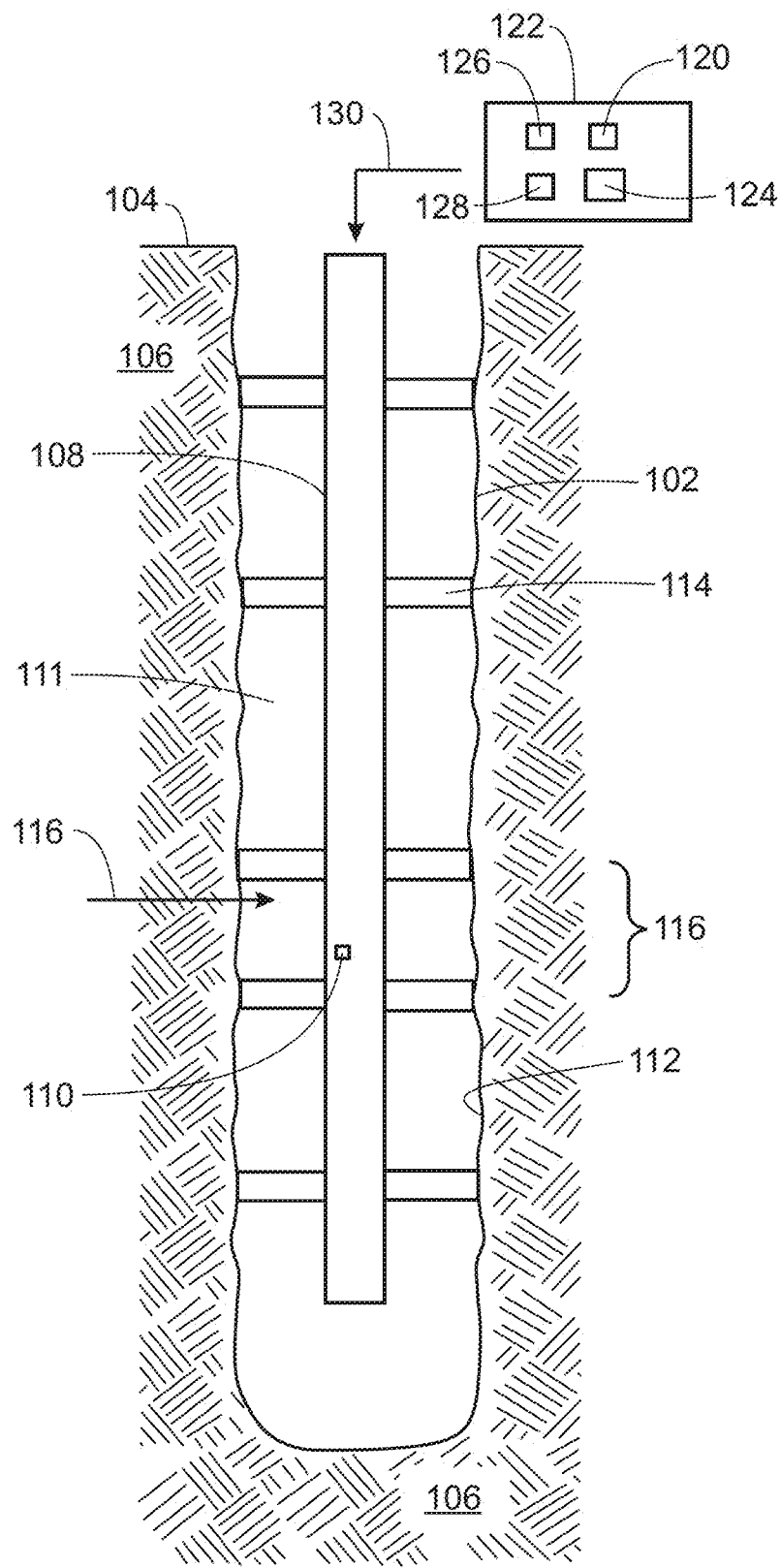
FIGS. 2-5 are diagrams of a well site having a wellbore formed through the Earth surface into a subterranean formation in the Earth crust.

FIG. 2 is a well site 100 having a wellbore 102 formed through the Earth surface 104 into a subterranean formation 106 in the Earth crust. As described below, the gellable shutoff material described above, e.g., composition including ZGS, activator (e.g., salt), orthosilicate (e.g., TEOS), acid (e.g., HCl), and water) may be the gellable treatment composition 120 to be applied through the wellbore 102 to treat the formation 106. The subterranean formation 106 may also be labeled as a geological formation, hydrocarbon formation, hydrocarbon reservoir, etc. Hydrocarbon is produced from the subterranean formation 106 through the wellbore 102 to the surface 104. The hydrocarbon may be crude oil or natural gas, or both. To produce the hydrocarbon, the hydrocarbon may flow from the subterranean formation 106 into the wellbore 102, and then into tubing 108 (e.g., production tubing) to flow to the surface 104. The "tubing" 108 as used herein is a generic term to include a conduit, tubing having perforations or holes, pre-perforated liner (PPL), production screens, and the like. In the illustrated embodiment, the hydrocarbon may flow from the formation 106 into the tubing 108 through entry components 110 disposed along the tubing 108. The entry components 110 may be, for example, holes, perforations, slots, mesh, valves, etc. The tubing 108 may be perforated tubing or perforated liner having the entry components 110 as perforations (holes) or slots. The tubing 108 may be a conduit, production conduit, production tubing, tubing with perforations, holes, or slots, PPL, production screens, etc. An annulus 111 in the wellbore 102 may be defined by the tubing 110 and the formation surface 112 or wellbore wall. The entry components 110 may allow for flow of fluid from the annulus 111 into the tubing 106. The entry components 110 may allow for flow of fluid (e.g., treatment fluid or treatment slurry) from the production tubing 110 into the annulus 111 and thus into the formation 106.

To form the wellbore 102, a hole is drilled into the subterranean formation 106 to generate the formation surface 112 (formation face) as an interface for the wellbore 102 with the subterranean formation 106. The formation surface 112 (wellbore wall) can be characterized as a wall of the wellbore 102. For a cased wellbore (not shown), the casing can be characterized as the wellbore 102 wall. The wellbore 102 diameter may be, for example, in a range from about 3.5 inches (8.9 centimeters) to 30 inches (76 centimeters), or outside of this range. The depth of the wellbore 102 can range from 300 feet (100 meters) to more than 30,000 feet (9,100 meters). The wellbore 102 can be vertical, horizontal, or deviated, or any combinations thereof. Once the wellbore 102 is drilled, the wellbore 102 may be completed.

The wellbore 102 may be openhole (as depicted) or have a cemented casing (not shown). For implementations with the wellbore 102 as cased, there may be cement between the casing and the formation surface 112. Perforations may be formed through the casing and cement into the subterranean formation 106 to facilitate or provide for hydrocarbon production from the subterranean formation 106 into the wellbore 102. In implementations, the perforations through the casing and cement may also accommodate the injection of fluids (e.g., including treatment compositions) from the wellbore 102 into the subterranean formation 106.

The wellbore 102 may be completed with multiple completion packers 114 disposed along the depth of the wellbore 102. The packers 114 may support the tubing 108 (e.g., support the weight of the tubing 108) and generally prevent or reduce movement of the tubing 108. The packers 114 may mechanically isolate sections of the annulus 111 between the tubing 108 and the formation surface 112. The packers 114 may be downhole devices installed in wellbore completions for isolation to facilitate control of production, injection, or treatment. The packers 114 (in isolating sections of the annulus 111) may separate the wellbore 102 into multiple zones (e.g., producing zones).

In the illustrated embodiment, the particular zone 116 (e.g., a producing zone) is a problematic zone in that a significant amount of unwanted fluid 118 enters the wellbore 102 from the subterranean formation 106. The zone 116 may be defined by the adjacent upper completion packer 114 and the adjacent lower completion packer 114. In implementations, the unwanted fluid 118 may be the majority of the total fluid that enters the wellbore 102 from the subterranean formation 106 at the zone 116. The total fluid that enters the wellbore 102 may be a combination of desired fluid (e.g., crude oil) and the unwanted fluid 118.

In some implementations, the unwanted fluid 118 is water and thus the zone 116 may be labeled as a water zone. Excessive water production from hydrocarbon-producing wells can adversely affect the economic life of the well. Unwanted water production can unfavorably influence well economics owing to handling of the produced water, reduction of hydrocarbon production, and environmental concerns.

In certain implementations, the fluid 118 may be natural gas that is unwanted because the well site 100 prefers production of crude oil and may not have surface facilities to collect and distribute the natural gas as product. Natural gas as a produced unwanted gas is generally separated and flared before the crude oil is distributed.

In embodiments, a gellable treatment composition 120 that is thermally activated downhole in the formation into a gel is applied to plug the subterranean formation 106 at the wellbore zone 116 to reduce or prevent the flow of the unwanted fluid 118 into the wellbore 102. The gellable treatment composition 120 is above-described present shutoff material. This treatment may isolate the formation 106 at the wellbore zone 116 from the wellbore 102. The treatment can be characterized as selective zonal isolation. This treatment of the formation 106 at the wellbore zone 116 may be characterized as shutoff of the unwanted fluid 118. For instances of the unwanted fluid 118 as water, the shutoff via the treatment may be labeled as water shutoff. For instances of the unwanted fluid 118 as gas (e.g., natural gas), the shutoff via the treatment may be labeled as gas shutoff.

The gellable treatment composition 120 as the aforementioned present shutoff-material composition as pumped from the surface 104 into the wellbore 102 may be labeled as a pre-gel or a precursor composition for a gel. The activator (salt) may promote (along with increasing temperature) the forming of the gel from the gellable treatment composition 120. The activator may increase the rate of formation of the gel. In other words, the presence of the activator may decrease the amount of time for the treatment composition 120 to gel at a given gelling temperature.

Embodiments may treat the wellbore zone 116 to plug porosity or fractures in the region of the subterranean formation 106 adjacent the zone 116 to prevent or reduce the flow of unwanted fluid 118 into the wellbore 102. The treatment may involve injection of the gellable treatment composition 120 (above-described gellable shutoff composition) into the wellbore 102 to the zone 116 of interest (and into the formation 106 at the zone 116).

The gellable composition 120 is thermally activated via formation 106 temperature into a gel (e.g., polymer gel or resin). The formation temperature 106 along with the acid (e.g., HCl) promotes conversion of the orthosilicate (e.g., TEOS) to silica nanoparticles in the gel. At the wellbore zone 116, the gel may damage (e.g., plug the porosity of) the formation face 112 and the near wellbore region of the subterranean formation 106. Such may reduce or prevent the flow of the unwanted fluid 118 into the zone 106, which stops or reduces the influx of the unwanted fluid 118 into the wellbore 102. The gel as gelled (cured) may solidify. The gellable treatment composition 120 may be activated via the activator (salt) in the composition 120 into a gel at a temperature (e.g., formation 106 temperature) greater than surface 104 ambient temperature. The composition 102 may gel at formation 106 temperature and with the activator salt acting as an accelerator of the gelling.

The gellable treatment composition 120 may be held as a pre-gel in a vessel of surface equipment 122 at the surface 104 and then introduced (e.g., via a pump 124 of the surface equipment 122) into the wellbore 102. The composition 120 may be formulated as a pill. The gellable treatment composition 120 may be introduced (e.g., pumped) into the wellbore 102. The gellable treatment composition 120 may be pumped by a surface pump 124 of the surface equipment 122 at the surface 104. The pump(s) 124 can be skid-mounted in some instances. The pump 124 may be a centrifugal pump, positive displacement (PD) pump, reciprocating PD pump such as a piston or plunger pump, and so on. In implementations, the treatment composition 120 is pumped through coiled tubing into the tubing 108 in the wellbore 102.

The surface equipment 122 at the Earth surface 104 may include equipment (e.g., vessels, piping, pumps, wellhead, etc.) to support operations at the well site 100 including the production of hydrocarbon (e.g., crude oil) via the wellbore 102 from the subterranean formation 106. The surface equipment 122 may include equipment for drilling, installing casing, cementing casing, and so forth.

The surface equipment 122 may include equipment to treat the wellbore 102, such as the pump(s) 124, downhole devices 126 (to be applied), a deployment extension such as coiled tubing 128 (e.g., to deploy the downhole devices 126 and flow the treatment composition 120), etc. The surface dispenser of the coiled tubing 128 at the surface 104 may be a coiled tubing reel (e.g., mounted on a vehicle).

In the oil and gas industries, coiled tubing generally refers to a metal pipe supplied spooled on a reel. The coiled tubing may be employed for interventions in oil and gas wells. The coiled tubing may be a flexible steel pipe that is inserted into a wellbore to convey well servicing tools and to flow fluids or slurries. In implementations, the coiled tubing may be constructed of strips of steel rolled and seam welded. The tubing may be flexible to be coiled onto a reel, and with diameters in the range, for example, of $\frac{3}{4}$ inch to $3\frac{1}{2}$ inch, or 1 inch to $3\frac{1}{4}$ inch.

The downhole devices 126 may be lowered into the wellbore 102 via a deployment extension (e.g., wireline, slickline, coiled tubing 128, etc.). The deployment extension from the Earth surface 104 at the wellbore 102 may lower or deploy a downhole device 126 into the wellbore 102. Thus, some downhole devices 126 may be deployed or lowered into the wellbore 102 via a wireline or coil tubing 128. In implementations, deployment and retrieval of the downhole devices 126 may be a rigless operation such as via wireline, slickline, coiled tubing, and the like. A rigless operation may be a well intervention conducted with equipment and support facilities that preclude the requirement for a rig over the wellbore.

The surface equipment 122 may include the downhole devices 126 to be deployed into the wellbore 102 for treatment of the wellbore 102 including facilitating application of the gellable treatment composition 120 to the zone 116 of interest. In implementations, the downhole devices 126 may be deployed via the coiled tubing 128 or other similar deployment extension. Thus, the application of the gellable treatment composition 120 to the wellbore 102 may be a rigless operation.

The use of [1] the coiled tubing 128 (into tubing 108), [2] deployment of the downhole devices 126 (into tubing 108) via the coiled tubing 128, and [3] introduction of the gellable treatment composition 120 through the coiled tubing 128 in the tubing 108 are indicated by reference numeral 130.

The devices 126 may include, for example, a retrievable bridge plug to be deployed (e.g., via coiled tubing 128) inside the tubing 108 to the lower completion packer 114 at the zone 116. The retrievable bridge plug may isolate the tubing 108 from further downhole in preventing downhole flow through the tubing 108 pass the depth of the lower completion packer 114 at the zone 116. The devices 126 may include, for example, a retrievable production packer to be deployed (e.g., via coiled tubing 128) inside the tubing 108 to the upper completion packer 114 at the zone 106. The retrievable production packer may direct the gellable treatment composition 120 (pumped from the surface 104 through the coiled tubing 126) into the zone 106. The treatment composition 120 may discharge from the coiled tubing in the tubing 108 at the zone 116 and flow through entry components 110 into the annulus 111 in zone 116.

At the zone 106 (annulus 111 isolated via packers 114), the gellable treatment composition 120 may flow from the annulus 111 into the subterranean formation 106. The motive force for flow of the treatment composition 120 may be provided by the surface pump 124. The treatment composition 120 as applied may gel in the formation 106, such as in the near wellbore region at the depth of the zone 106. The gel may foul (plug porosity) of the subterranean formation 106 in this near wellbore region at the zone 116 depth to stop or reduce the flow of the unwanted fluid 118 into the wellbore 102. The plugging of the formation face 112 and near wellbore region of the subterranean formation 106 at the wellbore zone 116 with the gel may isolate the zone 116 from the wellbore 102 and from contributing to production through the tubing 108 to the surface 104.

After completion of pumping the gellable treatment composition 120 into the wellbore 102, the downhole devices 126 (e.g., retrievable bridge plug and retrievable production packer) may be available for removal.

As discussed, the wellbore 102 may be openhole without casing or liner. For embodiments with the wellbore 102 as a cemented cased wellbore with or without the presence of completion packers 114, a downhole device 126 deployed to apply the gellable treatment composition 120 may be, for example, a straddle packer. The straddle packer may be deployed (e.g., via coiled tubing 128) to mechanically isolate a wellbore zone of interest (e.g., water zone, gas zone, etc.). In these implementations, the gellable treatment composition 120 may be pumped via pump 124 through coiled tubing 128 to the straddle packer and ejected from a nipple on the straddle packer into the zone. The zone may be mechanically isolated by the straddle packer the upper and lower inflatable elements of the straddle packer. The gellable treatment composition 120 as ejected by the straddle packer nipple may flow through the perforations through the cemented casing into the subterranean formation 106. The motive force for flow of the composition 120 through the perforations into the subterranean formation 106 may be provided by the pump 124. Again, the composition 120 is the gellable shutoff material (e.g., composition including ZGS, salt, TEOS, HCl, water) described above.

Figure 3:
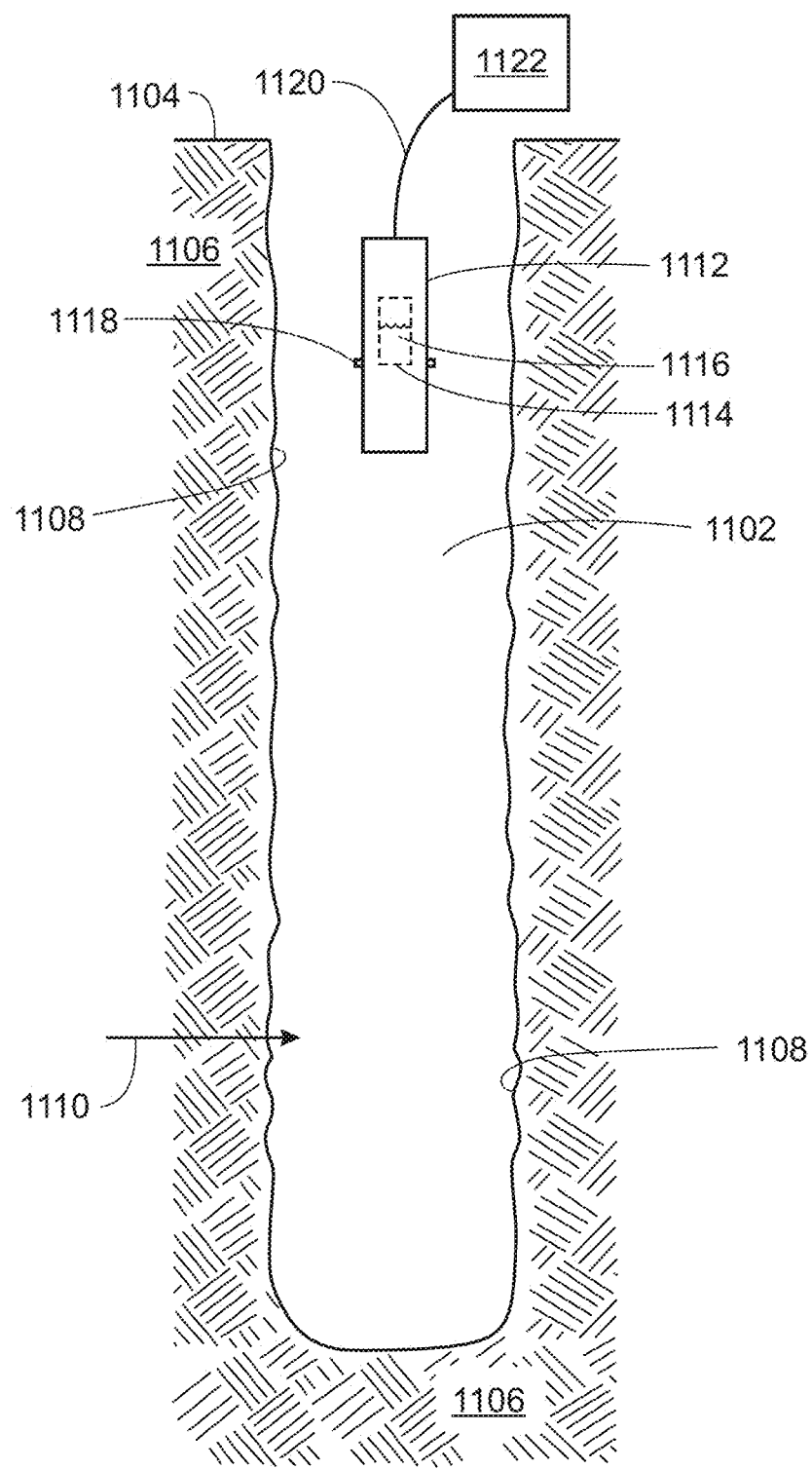

FIG. 3 is a well site 1100 having a wellbore 1102 through the Earth surface 1104 into a subterranean formation 1106 in the Earth crust. The subterranean formation 1106 may also be labeled as a geological formation, hydrocarbon formation, hydrocarbon reservoir, etc. Hydrocarbon is produced from the subterranean formation 1106 through the wellbore 1102 to the surface 1104. The hydrocarbon may be crude oil or natural gas, or both. To form the wellbore 1102, a hole is drilled into the subterranean formation 1106 to generate a formation surface 1108 as an interface for the wellbore 1102 with the subterranean formation 1106. The formation surface 1108 can be characterized as a wall of the wellbore 1102. The wellbore 1102 may be openhole or have a casing (not shown).

The illustrated wellbore 1102 has a water zone to be isolated. A water zone is an example of a problematic section in a wellbore 1102. The wellbore 1102 wall in the water zone may be the subterranean formation 1106 interface (formation surface 1108) defining that portion of the wellbore. Water 1110 may enter at a water zone into the production fluid. The water zone may include a permeable or fractured interface of the formation surface 1108 of the wellbore 1102. This problematic zone can be a water-producing zone within a hydrocarbon-producing zone. At the water zone, water 1110 enters the wellbore 1102 from the subterranean formation 1106. The water zone may be isolated to restrict introduction of the water 1110 into the wellbore 1102. The water zone may be isolated to prevent receipt of the water 1110 into the fluid flowing through the wellbore 1102. For example, the isolation may inhibit flow of the water 1110 into the produced hydrocarbon flowing through the wellbore 1102 to the Earth surface 1104. The isolation of the water zone involves treatment of the region of the formation 1106 at the water zone with the gellable treatment composition 1116 (analogous to gellable treatment composition 120 of FIG. 2) that is the gellable shutoff material described above, e.g., composition including ZGS, activator (salt), orthosilicate, acid, and water. The treatment may damage the formation 1106 to plug or reduce porosity by plugging the pores at the formation surface 1108 in the water zone. The orthosilicate (e.g., TEOS) is converted via the acid into silica nanoparticles in situ in the formation 1106. The ZGS may gel via the activator (e.g., salt) and the silica nanoparticles. The gel with the silica nanoparticles may solidify.

In the illustrated embodiment, an application device 1112 applies the gellable treatment composition 1116 to the water zone. Application of the gellable treatment composition 1116 plugs the formation 1106 at the water zone to isolate the water zone. The application device 1112 may include a chamber 1114 (inner cavity) containing the gellable treatment composition 1116 to be applied. The application device 1112 may have a nozzle or nipple 1118 to inject the gellable treatment composition 1116 from the chamber 1114. Again, the gellable treatment composition 1116 is the gellable shutoff material composition discussed herein, e.g., including ZGS, activator (salt), TEOS, acid (HCl), and water. In one implementation, the application device 1112 has a piston to push the gellable treatment composition 1116 from the chamber 1114 through the nozzle or nipple 1118. The application device 1112 may have multiple nozzles or nipples 1118. In some implementations, the application device 1112 is a straddle packer having the chamber 1114 and the nipple 1118. The gellable treatment composition 1116 injected from the application device 1112 (discharged or ejected through the nipple 1118) may contact the formation surface 1108 at the water zone to plug or foul the formation 1106 at the water zone.

To deploy the application device 1112, a deployment extension 1120 from a dispenser 1122 may lower the application device 1112 into the wellbore 1102. For application devices 1112 that are temporary or retrievable, the deployment extension 1120 may retrieve (raise, pull, remove) the application device 1112 from the wellbore 1102. In some implementations, the deployment extension 1120 is coiled tubing and the dispenser 1122 is a coiled tubing reel. In other implementations, the deployment extension 1120 is a wireline and the dispenser 1122 is a wireline truck. The deployment extension 1120 may be a conduit, cable, slickline, work string, drill string, or jointed pipe. The application device 1112 may be lowered to the water zone and then activated. When activated, the application device 1112 anchors (e.g., via mechanical slips) and discharges (ejects) the gellable treatment composition 1116 from the chamber through application-packer nozzle(s) 1118.

The application device 1112 may be a straddle packer or modified straddle packer. A straddle packer may be modified to incorporate features (for example, the gellable treatment composition chamber 1114 and nozzles 1118) of the application device 1112 if needed or applicable. Straddle packers (whether hydraulic or electric) may provide for isolation of a wellbore zone. Straddle packers and bridge plugs may provide zonal isolation in a wellbore. Present embodiments include a straddle packer having a chamber or inner cavity that carries the gellable treatment composition. When the straddle packer is activated, the straddle packer may anchor (mechanically set) against the formation surface 1108 and eject the gellable treatment composition to facilitate isolation of the zone of interest. Again, the application device 1112 may be a straddle packer having a chamber 1114 to carry the gellable treatment composition 1116 to isolate the water zone. The straddle packer having the gellable treatment composition in a chamber may deploy (form) the gellable treatment composition sealing at the water zone. When activated, the straddle packer anchors (mechanically sets) above and below the waters, and discharges (ejects) the gellable treatment composition from the chamber through straddle-packer nipple(s) into the region of the subterranean formation 1106 at the water zone to plug or seal features of the subterranean formation 1106 in the water zone. The treatment may be in the near wellbore region of the formation adjacent the wellbore at the water zone.

Lastly, the unwanted fluid 1110 may be gas or natural gas instead of water. The associated wellbore zone (problematic zone) may be a gas zone instead of a water zone. The treatment with the gellable treatment composition 1116 (shutoff material) may shutoff flow the gas into the wellbore.

Figure 4:
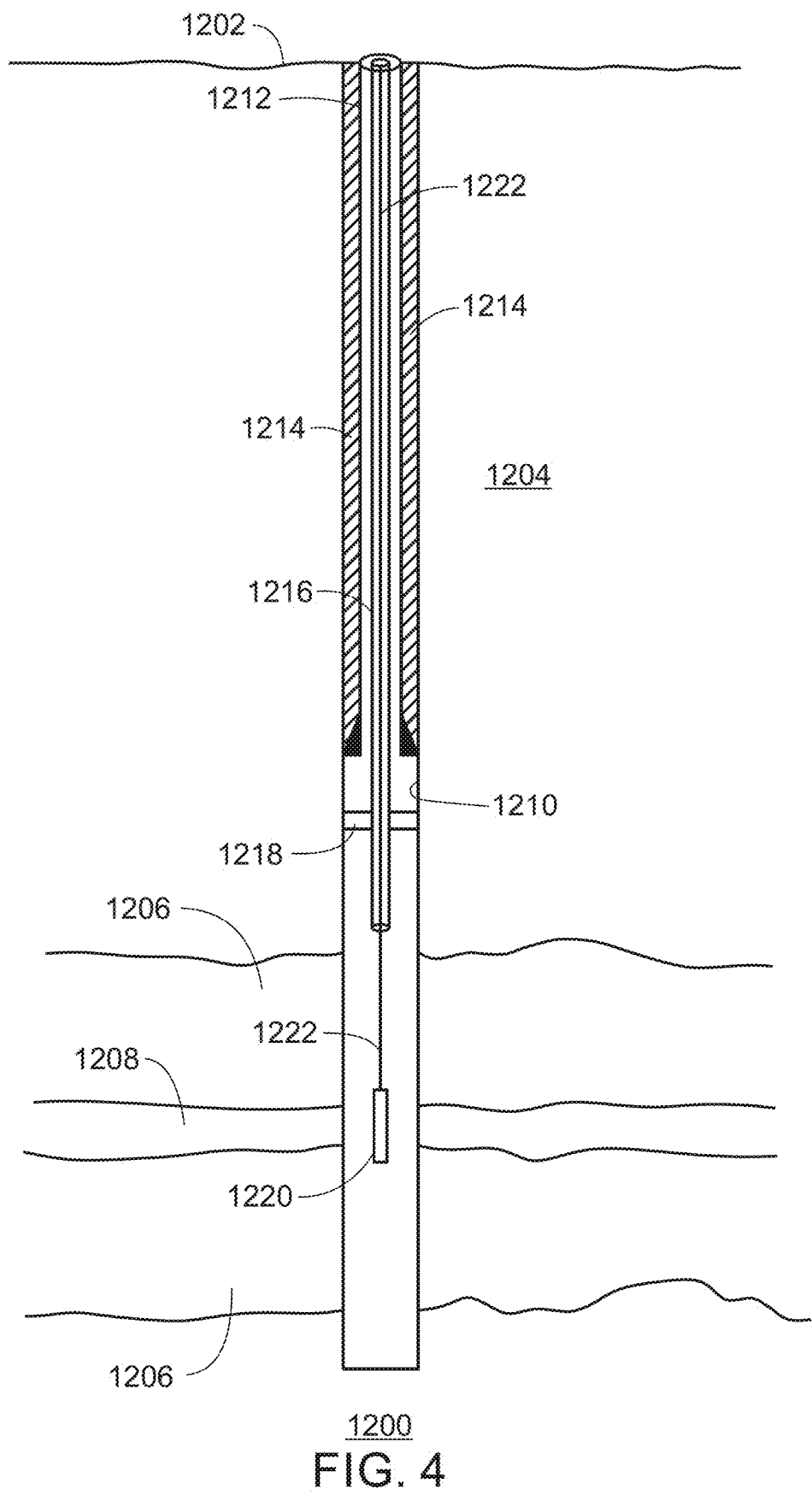

FIG. 4 is a wellbore 1200 formed through the Earth surface 1202 into a subterranean formation 1204. The subterranean formation 1204 includes hydrocarbon reservoir formations 1206 and an intervening water-producing zone 1208. Water may enter the wellbore 1200 from the water-producing zone 1208. That portion of the wellbore 1200 may be labeled as a water zone. Produced water may refer to subterranean formation water that is co-produced with the crude oil or natural gas. The produced water can cause production problems by generating emulsions, scale, and corrosion. The production of water may incur operational cost because the produced water must typically be separated from the hydrocarbons.

An inner surface of the wellbore 1200 is the formation surface 1210 of the subterranean formation 1204. In the illustrated embodiment, a portion of the wellbore 1200 has a casing 1212 with cement 1214 disposed between the casing 1212 and the formation surface 1210. The wellbore 1200 has a production tubing 1216 (through a production packer 1218) for the flow of produced fluid including hydrocarbon to the surface 1202. The hydrocarbon may be crude oil or natural gas that enters the wellbore 1200 from the hydrocarbon reservoir formations 1206.

The produced fluid flowing upward through the production tubing 1216 also includes water that enters the wellbore 1200 from the water-producing zone 1208. It may be desired to isolate the water zone in the wellbore 1200 to prevent water from water-producing zone 1208 entering the wellbore 1200 and becoming a component of the production fluid. The isolation of the water zone may be mechanical or chemical (or a combination of mechanical and chemical). The chemical treatment for water shut-off may be by an application device 1220 that is the same or analogous to the application device 1110 of FIG. 3, and in which the gellable treatment composition 1116 is applied (ejected) from the application device 1220. In implementations, the application device 1220 may be a straddle packer.

The application device 1220 may be deployed via a deployment extension 1222 to the water zone in the wellbore (at the water-producing zone 1208). In some embodiments, the deployment of the application device 1220 into the wellbore 1200 may be rigless. A rigless operation may be a well intervention conducted with equipment and support facilities that preclude the requirement for a rig over the wellbore 1200. The deployment extension 1222 may be coiled tubing, wireline, or slickline for rigless deployment. The application device 1220 or straddle packer may mechanically set at or around the water zone and eject the gellable treatment composition (e.g., 1116 of FIG. 3) into a region of the formation 1204 (at the water-producing zone 1208) to seal the formation 1204 at the water zone. The orthosilicate (e.g., TEOS) is converted via the formation temperature and acid into silica nanoparticles in situ in the formation 1106. The formation temperature may provide for the ZGS to gel via the activator (e.g., salt) and the silica nanoparticles. The gel with the silica nanoparticles may solidify. Such may restrict or reduce introduction of water from the water-producing zone 1208 into the wellbore 1200.

Lastly, the water-producing zone 1208 may instead be a natural-gas producing zone 1208, and in which natural gas is an undesired produced fluid. Thus, the treatment may shutoff introduction of the natural gas into the wellbore 1200.

Figure 5:
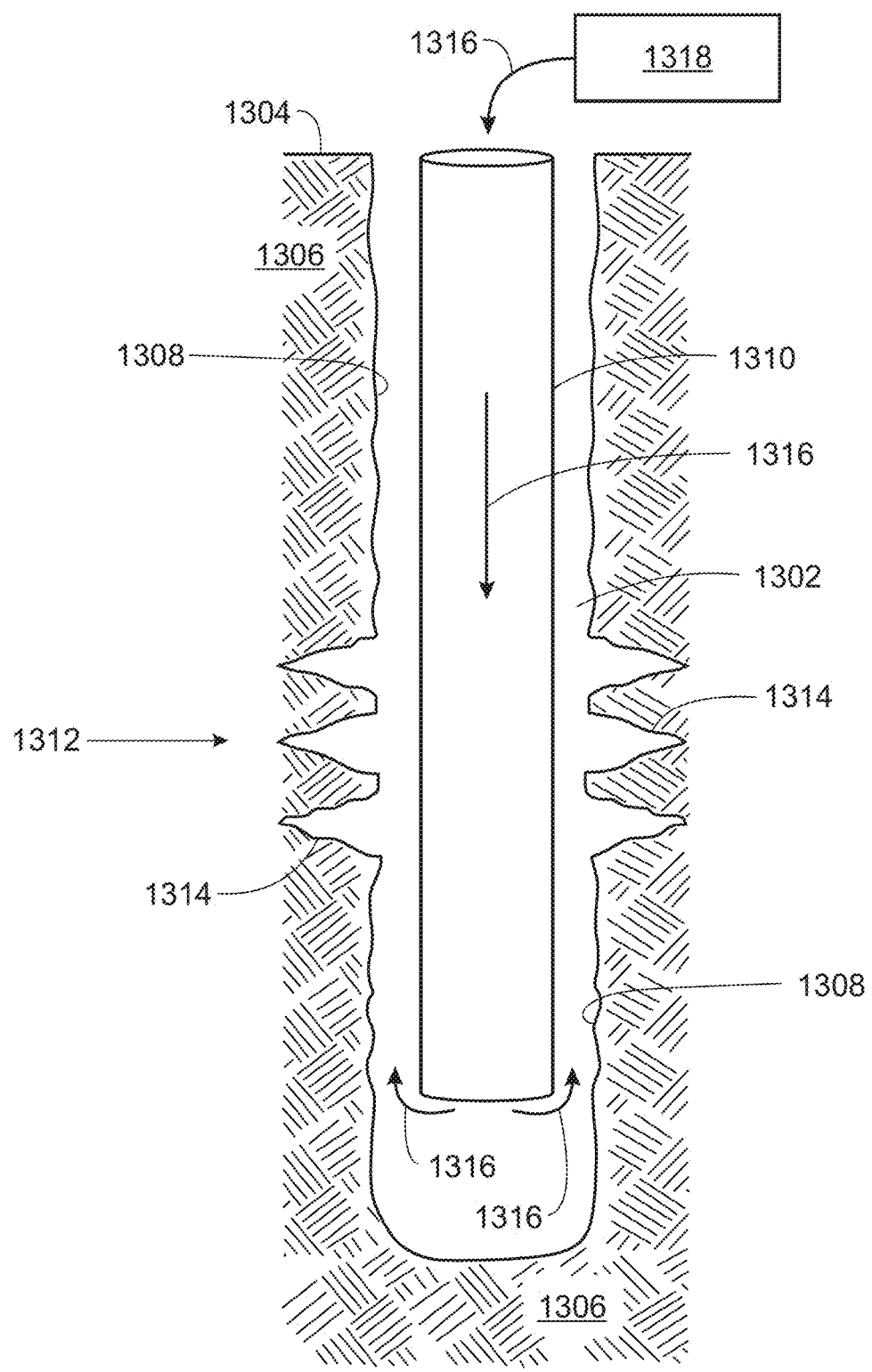

FIG. 5 is a well site 1300 having a wellbore 1302 through the Earth surface 1304 into a subterranean formation 1306 in the Earth crust. A gellable treatment composition 1316 analogous to the gellable treatment compositions 120, 1116 (FIGS. 2-3) that is the gellable shutoff material described above, e.g., composition including ZGS, activator (salt), TEOS, acid (HCl), and water, may be applied through the wellbore 1302 to treat the formation 1306. The subterranean 1306 may also be labeled as a geological formation, hydrocarbon formation, reservoir, etc. Hydrocarbon may be produced from the subterranean formation 1306 through the wellbore 1302 to the surface 1304. The hydrocarbon may be crude oil or natural gas, or both. To form the wellbore 1302, a hole (borehole) is drilled into the subterranean formation 1306 to generate a drilled formation surface 1308 as an interface for the wellbore 1302 with the subterranean formation 1306. The formation surface 1308 may be characterized as the wellbore 102 wall. The wellbore 1302 may have openhole portions but generally includes a cylindrical casing 1310 as shown. The wellbore 1302 in the depicted implementation of FIG. 5 is a cased wellbore 1302. In the illustrated embodiment, the wellbore 1302 has a zone 1312 to be treated.

In implementations, the zone 1312 may be a water zone in which water is introduced into the wellbore 1302 from the subterranean formation 1308. The zone 1312 may be a gas zone in which undesired gas (e.g., natural gas) is introduced into the wellbore 1302 from the subterranean formation 1308. The water or gas may be introduced through features 1314 (e.g., fractures, permeable channels, high permeability portions, etc.) that contribute to introduction of excess water or excess gas from the subterranean formation into the wellbore 1302. In some instances, the features 1314 may be typical features along the wellbore 1302 and not resembling the represented emphasized indentations into the formation 1308.

The gellable treatment composition 1316 that is the gellable shutoff material discussed herein may be introduced (e.g., pumped) into the wellbore 1302. The gellable treatment composition 1316 as shutoff material flows through the casing 1310, discharges from the bottom portion of the casing 1310, and flows upward through the annulus between the casing 1310 and the formation surface 1308. The gellable treatment composition 1316 may invade the features 1314 to plug or seal the features 1314 in that region of the formation 1306 to stop or reduce water flow (or gas flow) from the subterranean formation 1306 through the features 1314 into the wellbore 1302. The treatment may be in near wellbore region of the formation 1306.

The gellable treatment composition 1316 may be pumped by a surface pump (e.g., mud pump) of the surface equipment 1318 at the surface 1304. In certain implementations, the pump may be associated with a drilling rig. The pump(s) can be skid-mounted in some instances. The pump may be a centrifugal pump, positive displacement (PD) pump, reciprocating PD pump such as a piston or plunger pump, and so on. The surface equipment 1318 may include equipment (e.g., vessels, solid-handling equipment, piping, pumps etc.) for handling or preparing the gellable treatment composition 1316. The surface equipment 1318 may include equipment to support other operations at the well site 1300.

Figure 6:
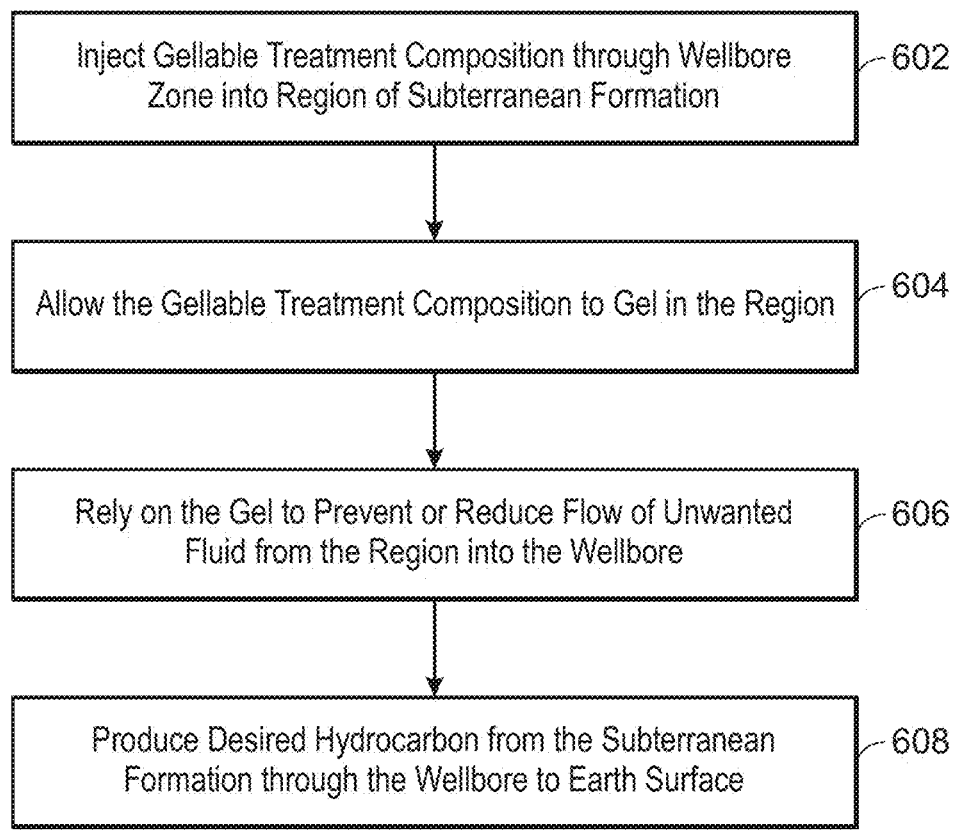
FIG. 6 is a block flow diagram of a method of treating a region of a subterranean formation adjacent a wellbore zone of a wellbore

FIG. 6 is a method 600 of treating a region of a subterranean formation adjacent a wellbore zone of a wellbore. The treatment may be to isolate a wellbore zone with a gellable treatment composition that is shutoff material.

At block 602, the method includes injecting a gellable treatment composition through the wellbore zone into the region of the subterranean formation adjacent the wellbore zone. The gellable treatment composition may be a shutoff composition to shutoff the flow of the unwanted fluid into the wellbore zone from the region. The gellable treatment composition as injected includes ZGS, salt, orthosilicate, acid, and water.

At block 604, the method includes allowing the gellable treatment composition to gel in the region via heat provided by the region to prevent or reduce flow of an unwanted fluid from the region into the wellbore zone, wherein allowing the gellable treatment composition to gel includes forming nanoparticles (e.g., silica nanoparticles) in-situ in the region via the gellable treatment composition. The unwanted fluid may include water or natural gas, or both. The gellable treatment composition may include an activator to promote gelling of the gellable treatment composition in the region along with the heat provided by the region, wherein the heat provided by the region increases temperatures of the gellable treatment composition in the region. The gellable treatment may include ZGS, wherein the activator includes salt, and wherein allowing the gellable treatment composition to gel comprises gelling of the ZGS in the region via the salt. The gellable treatment composition may include orthosilicate (e.g., TEOS, TMOS, etc.) that is catalyzed via an acid (e.g., HCl) in the gellable treatment composition into the nanoparticles including silica nanoparticles. The gellable treatment composition may include an activator (e.g., salt) and ZGS that is a VES, wherein allowing the gellable treatment composition to gel involves gelling of the ZGS in the region via the activator, and wherein heat from the region increasing temperature of the gellable treatment composition promotes gelling of the ZGS. The salt may include calcium chloride, sodium chloride, potassium chloride, sodium bromide, sodium citrate, or sodium salicylate, or any combinations thereof.

At block 606, the method includes preventing or reducing flow of the unwanted fluid from the region into the wellbore by the presence of the formed get in the region. Such may be characterized as water shutoff for the unwanted fluid as water, or as gas shutoff for the unwanted fluid as gas (e.g., natural gas).

At block 608, the method includes producing desired hydrocarbon from the subterranean formation through the wellbore to Earth surface, wherein a gel formed from the gellable treatment composition in the region prevents or reduces production of the unwanted fluid from the region, and wherein the gel includes the nanoparticles (e.g., silica nanoparticles). The desired hydrocarbon may be, for example, crude oil or natural gas, or both.

An embodiment is a wellbore in a subterranean formation. The wellbore includes a wellbore zone having a gel that restricts flow of fluid (e.g., water or natural gas, or both) from the subterranean formation into the wellbore at the wellbore zone. The gel includes ZGS and silica nanoparticles. In implementations, the gel prevents flow of fluid from the subterranean formation into the wellbore at the wellbore zone. In implementations, the ZGS can be the following structure reproduced from FIG. 1, where R can be as given and can be, for example, a sulfonate group, a carboxylate group, an aldehyde group, or hydroxyl group.

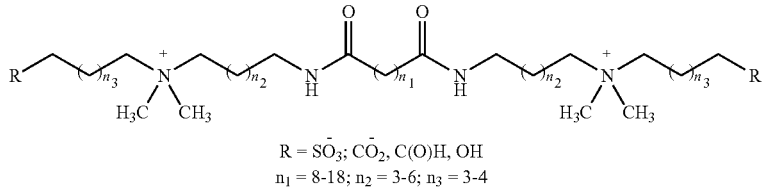

$R = SO_3^-; CO_2^-, C(O)H, OH$
$n_1 = 8\text{-}18; n_2 = 3\text{-}6; n_3 = 3\text{-}4$ An embodiment is a pill as applied to a wellbore formed through Earth surface in a subterranean formation. A pill may be quantity of a mixture to treat a wellbore or associated subterranean formation. The pill as applied to the wellbore may involve the pill as formulated at the Earth surface and as injected (e.g., pumped) into the wellbore. The pill includes ZGS, salt, orthosilicate (e.g., TEOS, TMOS, etc.), acid (e.g., HCl), and water. The salt may be calcium chloride, sodium chloride, potassium chloride, sodium bromide, sodium citrate, or sodium salicylate, or any combinations thereof. In implementations, the concentration of the ZGS in the pill is in a range of 2.5 wt % to 10 wt %, the concentration of the salt in the pill is in a range of 5 wt % to 30 wt %, the concentration of the orthosilicate in the pill is in a range of 1 wt % to 10 wt %, and the concentration of the acid in the pill is at least one molar equivalent to the orthosilicate. In implementations, the ZGS (e.g., see FIG. 1) can be the structures as discussed.

Example

The Example is given only as an example and not intended to limit the present techniques. The Example reflects in-situ synthesis of nanoparticles at increasing temperature along with the gelation of viscoelastic surfactant. For this purpose of nanoparticle synthesis, TEOS was added along with a catalytic amount of dilute HCl to the mixture, as discussed below.

Initially, a zwitterionic gemini surfactant (ZGS) was dissolved in $CaCl_2$) 20 wt % solution in water at ratio of 5 wt %: 95 wt % in three different vials separately. The ZGS was the ZGS in FIG. 1 with $n_1=8$, $n_2=3$ and $n_3=3$. Then, TEOS (0.5 mL, 1.5 mL and 3.0 mL, respectively) and a few drops of HCl were added to each vial and the mixture in each vial stirred for 30 minutes at 90° C. The heating and stirring at 90° C. for 30 minutes gave a jelly-like product as formed in each of the three vials. The viscosity of the jelly-like product in each vial was measured at room temperature, 40° C., and 90° C., as portrayed in Table 1. The viscosity in given in centipoise (cP). The shear rate (for the viscosity measurement) is given in reciprocal seconds (1/s).

Figure 7:
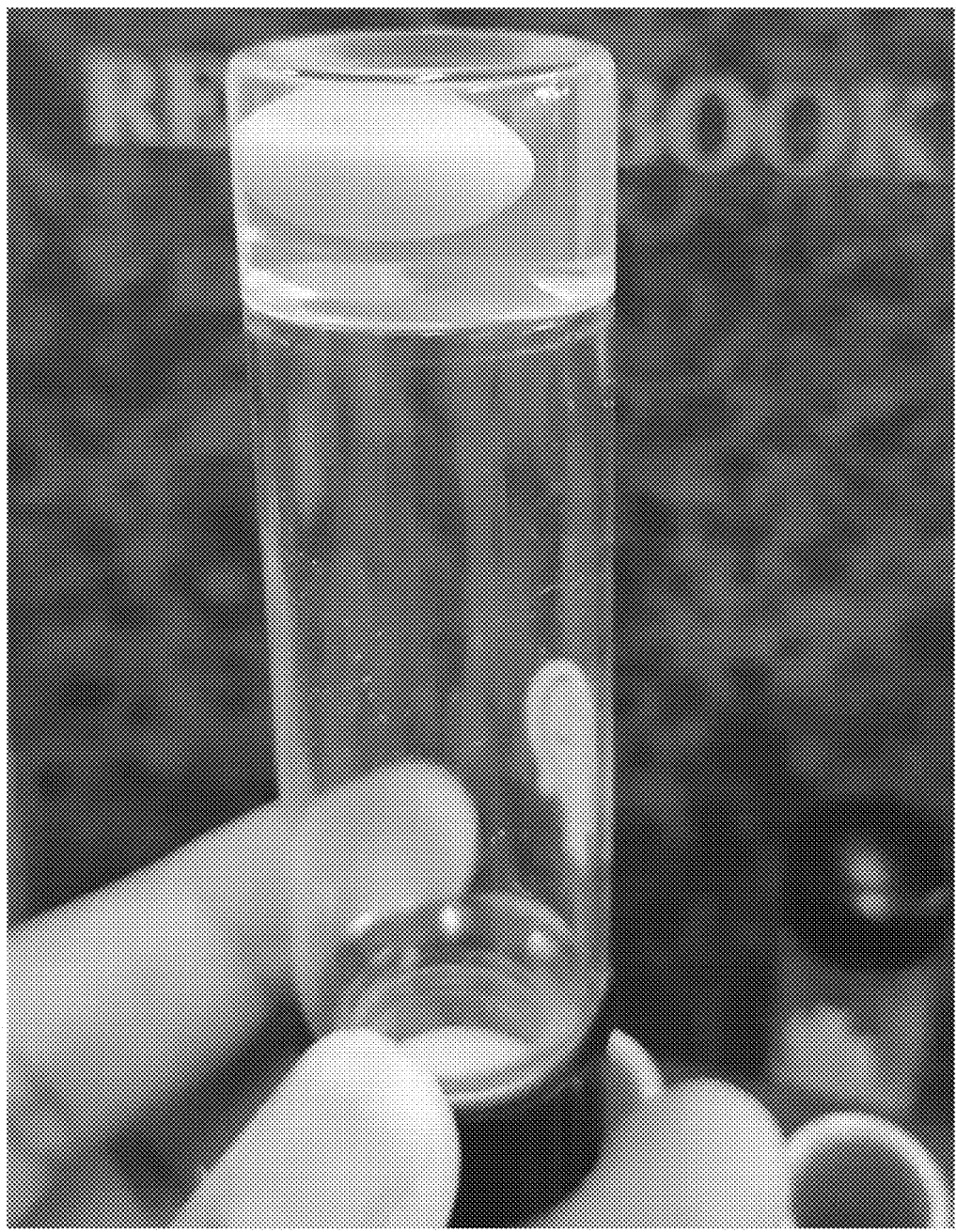
FIG. 7 is an image of an inverted vial from the Example.

After overnight stay at room temperature, the jelly material demonstrated viscosity build-up, as indicated with inversion of the vials. FIG. 7 depicts one of the vials inverted after overnight. FIG. 7 indicates the gelation of short-chain ZGS.

It should be noted that the TEOS and HCl solution were sequentially added to the solution mixture of ZGS in $CaCl_2$). The hydrolysis of monomeric TEOS and then formation of $SiO_2$ nanoparticles was ensured within each same vial. In other words, $SiO_2$ nanoparticles were produced within the same vial in the solution mixture rather than producing the $SiO_2$ nanoparticles separately and adding the $SiO_2$ nanoparticles to the solution. The HCl catalyzes the hydrolysis of TEOS to produce to hydrolyzed precursors of TEOS. The hydrolyzed precursors are then transformed to oligomeric precursors, which eventually lead to the formation of $SiO_2$ nanoparticles.

TABLE 1

| | Viscosification results of ZGS with $SiO_2$ in $CaCl_2$ solutions (20%) | | | | | | | | |
|---|---|---|---|---|---|---|---|---|---|
| Shear | ZGS-5% + $CaCl_2$(20%)-95% + TEOS(0.5 mL) | | | ZGS-5% + $CaCl_2$(20%)-95% + TEOS(1.5 mL) | | | ZGS-5% + $CaCl_2$(20%)-95% + TEOS(3.0 mL) | | |
| Rate | RT | 40° C. | 90° C. | RT | 40° C. | 90° C. | RT | 40° C. | 90° C. |
| 1.02 | 343.8 | 351.6 | 1258 | 343.8 | 351.6 | 382.8 | 335.9 | 343.80 | 397.40 |
| 7.38 | 48.6 | 50.76 | 195.5 | 49.68 | 49.68 | 130.6 | 48.6 | 54.00 | 143.80 |
| 17.32 | 23 | 23.46 | 80.04 | 22.54 | 22.54 | 66.6 | 23.46 | 26.22 | 107.45 |
| 33.13 | 13.95 | 13.95 | 28.62 | 13.71 | 13.71 | 62.56 | 14.19 | 16.60 | 98.12 |
| 58.21 | 9.99 | 9.72 | 17.52 | 10.13 | 9.45 | 62.72 | 10.68 | 12.32 | 91.23 |
| 85.00 | 8.63 | 8.16 | 13.31 | 8.81 | 8.25 | 61.56 | 9.66 | 10.50 | 84.25 |

Table 1 shows the viscosification behavior of the ZGS with varying TEOS concentrations as a function of shear rate and temperature. It can be observed that the shutoff composition exhibits a shear thinning behavior and thus making the shutoff composition easier to pump and place in the downhole water (or gas) producing zone. Furthermore, the shutoff composition exhibits gelation as the temperature increases.

A number of implementations have been described. Nevertheless, it will be understood that various modifications may be made without departing from the spirit and scope of the disclosure.

What is claimed is:

1. A wellbore in a subterranean formation, the wellbore comprising a wellbore zone having a gel that restricts flow of fluid from the subterranean formation into the wellbore at the wellbore zone, wherein the gel comprises zwitterionic gemini surfactant and silica nanoparticles, wherein the silica nanoparticles are formed in situ from orthosilicate catalyzed by an acid.

2. The wellbore of claim 1, wherein the zwitterionic gemini surfactant comprises:

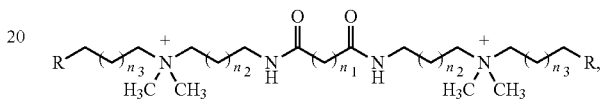

wherein $n_1$=8 to 18, $n_2$=3 to 6, and $n_3$=3 or 4, and wherein the functional group R is a sulfonate group, a carboxylate group, an aldehyde group, or a hydroxyl group.

3. The wellbore of claim 1, wherein the fluid comprises water or natural gas, or both.

4. The wellbore of claim 1, wherein the gel prevents flow of fluid from the subterranean formation into the wellbore at the wellbore zone.

* * * * *